United States Patent [19]
Arosio

[11] Patent Number: 5,884,897
[45] Date of Patent: Mar. 23, 1999

[54] QUICK-ACTION MALE COUPLING CONNECTABLE UNDER PRESSURE

[75] Inventor: Massimo Arosio, Rivolta D'Adda, Italy

[73] Assignee: Omba S.r.L., Melzo, Italy

[21] Appl. No.: 94,249

[22] Filed: Jun. 9, 1998

[30] Foreign Application Priority Data

Nov. 28, 1997 [IT] Italy .................................. MI97A2653

[51] Int. Cl.[6] .................................................. F16L 37/28
[52] U.S. Cl. .................................. 251/149.6; 137/614.03; 137/614.05
[58] Field of Search .................. 137/614.05, 614.03, 137/614; 251/149.6

[56] References Cited

U.S. PATENT DOCUMENTS

| | | | |
|---|---|---|---|
| 4,289,164 | 9/1981 | Ekman | 137/614.03 |
| 4,924,909 | 5/1990 | Wilcox | 137/614.03 X |
| 5,076,325 | 12/1991 | Ekman | 137/614.05 X |
| 5,662,141 | 9/1997 | Arosio | 137/614.05 |

*Primary Examiner*—Kevin Lee
*Attorney, Agent, or Firm*—Kirschstein, et al.

[57] ABSTRACT

Quick-action male coupling (1) connectable under pressure and having a tubular outer body (2) containing a valve guide (7) supported so as to be central and defining flow channels (FC) for the fluid, and an inner valve (9) which is selectively pushed so as to tend to close the mouth (8) of the outer body (2), wherein a sliding tubular body (20) is present between the outer body (2) and the valve guide (7); the sliding tubular body (20) is pushed by a spring so as to tend to close the flow channels (FC); in the closed position the sliding tubular body (20) is in sealing contact with the outer body (2) and with the valve guide (7) and experiences hydrostatic pressures of equal magnitudes but opposite directions exerted by the fluid; and the sliding tubular body (20) is pushed by the inner valve (9) so as to tend to open the flow channels (FC).

11 Claims, 5 Drawing Sheets

QUICK-ACTION MALE COUPLING CONNECTABLE UNDER PRESSURE

The invention relates to a quick-action male coupling connectable under pressure and having a tubular outer body containing a valve guide, supported so as to be central, and an inner valve situated forward of the valve guide and pushed by a spring so as to tend to close the mouth of the coupling.

These quick-action couplings enable connection and disconnection of two sections of a hydraulic circuit without fluid leakage or the ingress of air into the circuit.

In particular, these couplings contain an inner valve which, in the closed position, is aligned with the flat front surface of the tubular outer body, giving the male coupling a flat connection face.

It is known that one of the main problems with this type of quick-action coupling is the difficulty to couple the two sections of the hydraulic circuit when there is residual pressure in the male half. This is because the male half of the quick-action coupling is normally applied to the section of hydraulic circuit associated with the machine using the pressurized fluid, which, unlike the power supply, does not generally have mechanisms or systems capable of regulating its internal pressure.

In particular, the internal pressure of the hydraulic circuit of a user machine can vary in response to factors not under the control of the operators, such as sudden temperature changes and incorrect positioning of the tools. Consequently it is possible for large residual pressures to occur in the section of hydraulic circuit associated with the user machine and therefore large residual pressures in the male half of the quick-action coupling when disconnected from the power supply.

Prior-art quick-action couplings, especially flat-faced quick-action couplings, cannot be connected when there is pressurized fluid in the male half because the high pressure present inside the coupling acts on the inner valve and prevents it from being retracted and so connected to the female half.

This problem is solved at present by means of quick-action couplings having lever-operated connecting mechanisms on the female half of the coupling. These mechanisms grip the male half, overcome the fluid pressure and force the male half to couple with the female half.

The complexity of these lever-operated mechanisms makes them practical only in hydraulic systems employing a large number of connections.

Furthermore, these lever-operated mechanisms are very bulky and heavy and necessitate the use of special supporting and connecting panels for the female halves of the couplings associated with the power supplies.

Quick-action couplings having special engagement devices coaxial with the individual female half are also known.

These engagement devices use complex locking ring nuts and devices to connect the male half securely to the engagement devices of the female half without opening the internal vales of the coupling. Only once the pressurized male half has been engaged is it possible to open the hydraulic circuit by counterbalancing the pressure inside the male half with an increase in the pressure of the fluid present in the female half and open the valves of the coupling.

The problem with this system is that the female halves are bulky because of the presence of the additional anchoring ring nuts and of the ring nut locking devices. The complexity of these mechanisms and their greater bulk mean that this system cannot easily be used in situations where there is limited space for connecting the sections of the hydraulic circuit.

Furthermore, in heavily contaminated or fouled environments it is more likely that these mechanisms, consisting as they do of a considerable number of parts, will jam.

The object of the present invention is to overcome the disadvantages of the prior art, as enumerated above, and in particular to allow connection of the male half, even when it contains fluid under pressure, with a system of simple construction.

The object is achieved by means of a quick-action male coupling connectable under pressure, consisting of an outer body, a valve guide and an inner valve, wherein between the outer body and the valve guide is a sliding tubular body; at one end the sliding tubular body is pushed by a spring so as to tend to close the coupling; the opposite end of the sliding tubular body from that pushed by the spring has an abutment seat; the outer body internally presents an opposing abutment seat to the sliding tubular body; between the sliding tubular body and the outer body is a sealing means; between the sliding tubular body and the valve guide is a second sealing means; the contact surfaces of the sealing means and of the second sealing means are aligned; and, as the inner valve opens, the sliding tubular body is displaceable by an annular operating relief on the inner valve.

The opposing abutment seat on the inside of the outer body defines the position of the sliding tubular body in which the flow channels are closed.

The annular operating relief on the outside of the inner valve constitutes an abutment for the sliding tubular body which allows the inner valve, when pushed open by the female half of the coupling, to engage the sliding tubular body and so open the fluid flow channels.

In order to seal off the fluid flow channels present between the outer body and the valve guide on surfaces that produce balanced pressures and hence pressures of equal magnitude but opposite direction of application in the sliding tubular body, the sliding tubular body comprises, at the end nearest the mouth of the tubular outer body, a tubular extension that can be inserted leaktightly into a cylindrical seat present on the inside of the outer body; and at the end furthest from the mouth of the outer body the sliding tubular body comprises an internal seat that leaktightly houses the valve guide; and the seat of the sliding tubular body and the cylindrical seat of the outer body are of the same diameter.

In order to produce a leaktight surface for the sliding tubular body and a seat for housing the inner valve when in the open position, the valve guide is cup-shaped and its concavity is turned toward the mouth of the tubular outer body.

In closing the fluid flow channels formed between the tubular outer body and the valve guide, the sliding tubular body confines the fluid, which may be under pressure, to the opposite end of the quick-action male coupling from the mouth of the tubular outer body, defining a chamber to the rear of the sliding tubular body.

The sliding tubular body also defines front chambers which communicate with each other and contain fluid at a low pressure (close to atmospheric pressure).

In order to allow free circulation of the fluid through the front chambers during the movement of opening the inner valve, the inner valve comprises, in its lateral skirt, a plurality of through-flow communication holes for the fluid that is present around the inner valve.

For simple, speedy assembly of the components of the coupling and for connection of the coupling to the hydraulic circuit section, the tubular outer body is composed of a tubular base comprising, connected to a tubular adaptor, a shaped outer surface for engagement with the female half of the coupling.

In order to ensure an efficient seal between the sliding tubular body and the tubular outer body, the sliding tubular body possesses an external annular seat housing a seal, and the seal is held fast to the sliding tubular body by a gland.

In order to prevent the pressurized fluid from forcing the seal out of its seat in the sliding tubular body, the seal projects out of the annular seat by $1/20$ to $5/10$ of the height of its transverse section.

In order to reduce wear from the sliding of the sliding tubular body and ensure the desired toughness, the seal of the sliding tubular body is of polyurethane.

In order to ensure leaktightness between the valve guide and the sliding tubular body, the valve guide possesses an external annular seat housing a seal, for example an O-ring seal.

The sliding tubular body advantageously seals the element directly on the surfaces of the valve without any intermediate seals.

In order to support and guide the spring of the sliding tubular body, the valve guide possesses an external annular seat for the spring of the sliding tubular body.

In order to support the inner valve in the center of the tubular outer body and guide the inner valve in its opening and closing movements, a tubular extension of the sliding tubular body supports and guides the inner valve.

The principal advantages of the invention may be seen in the fact that the male half can be connected to the female half of the coupling with a very low level of force even when there is fluid under pressure in the male half, and without using cumbersome and complicated coupling mechanisms.

This is because the pressurized fluid is confined by the sliding tubular body in the rear chamber of the male half of the coupling and does not therefore act directly on the inner valve, which, being free to move back, enables effortless connection of the male half to the female half of the coupling.

Only when the valve of the female half is partly open do the flow channels of the pressurized fluid in the male half open as the sliding tubular body moves back and allows the fluid to flow through the female half.

Even this operation of opening the flow channels is carried out without particular effort, the valve that occludes the flow channels being a sliding tubular body pushed in a balanced manner by the pressurized fluid. The sliding tubular body can consequently slide with a very low level of force in the pressurized fluid as it is pushed on its opposite sealing surfaces by equal hydrostatic forces.

Another advantage is the fact that in the proposed version the coupling is externally free of cumbersome and complicated connecting devices. This facilitates and simplifies the operations of connecting the coupling together.

Since it contains no parts that will easily collect dirt or become jammed, the proposed coupling is also more reliable.

The outer surface of the male component of the coupling is advantageously unmodified in its geometry and in particular in the profile involved in connecting to the female half. The male half of the coupling can therefore be connected to existing female halves. The male valves present in existing hydraulic systems can therefore be replaced without having also to replace all the female halves of the couplings.

The invention will now be described in greater detail and explained by means of an embodiment provided purely by way of example in the accompanying drawings, in which.

Figure 1:
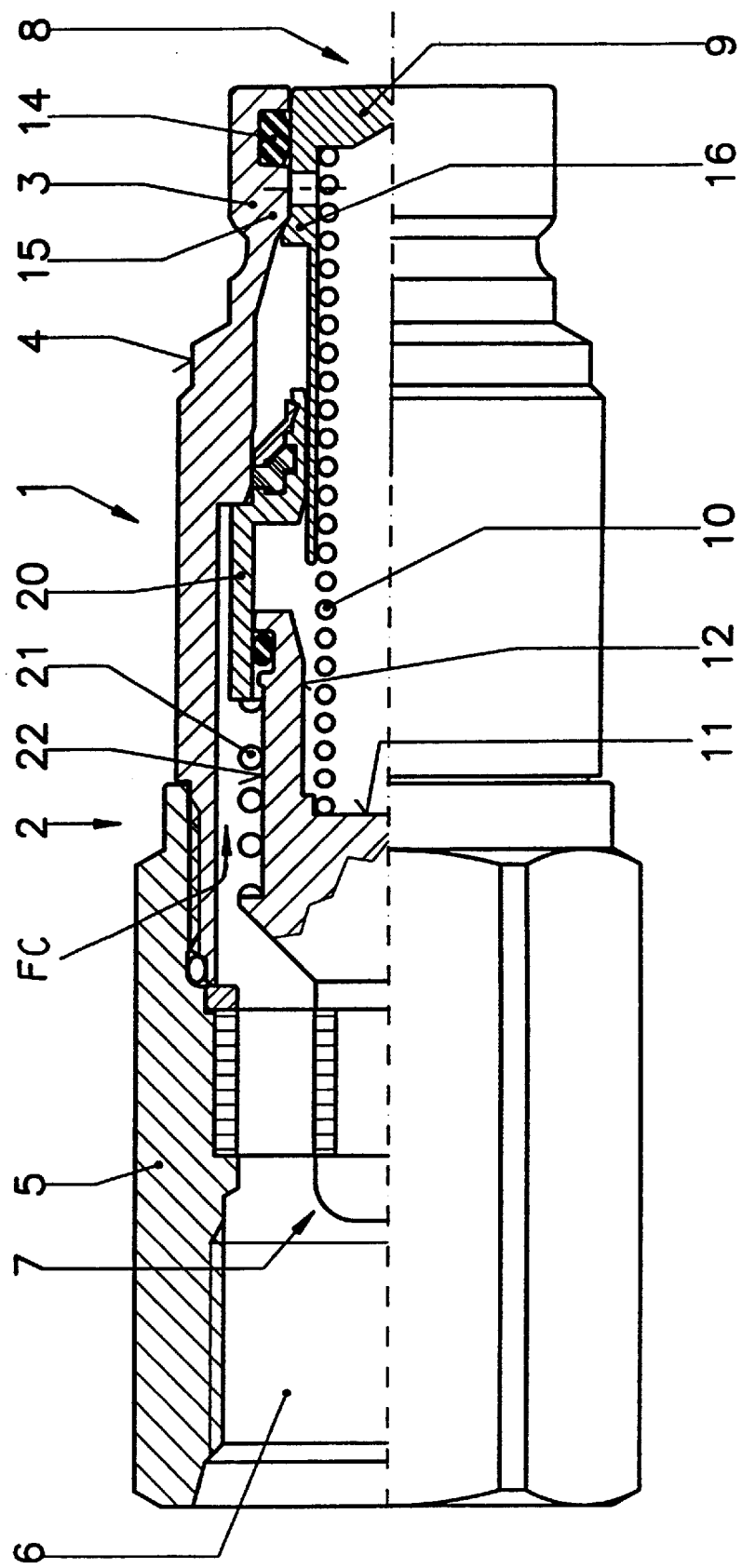
FIG. 1 illustrates the male half of a quick-action coupling in a partially sectioned side view.

In FIG. 1 the male half of a flat-faced quick-action coupling can be seen under the general reference 1.

The male half of the coupling 1 comprises a tubular outer body under the general reference 2.

The tubular outer body 2 comprises a tubular base 3 having an external profile 4 which is already known per se for connection to a female half (not illustrated in FIG. 1)

At the opposite end from the connection profile 4, the tubular base 3 is connected leaktightly in a tapped seat in an adaptor 5.

The other end of the adaptor 5 comprises an internal screwthread 6 for connection to a hose for a section of a hydraulic circuit belonging to a user machine (these are not shown).

Inside the tubular outer body 2 is a valve guide, with the general reference 7, supported so as to be central.

The valve guide 7 is advantageously cup-shaped and its concavity is turned toward the mouth 8 of the tubular base 3.

The valve guide 7, supported so as to be in the center of the tubular outer body 2, defines flow channels (FC) for the fluid.

Inside the tubular outer body 2 and interposed between the mouth 8 of the tubular base and the valve guide 7 is an inner valve 9.

The inner valve 9 is pushed by a spring 10 so as to tend to close the mouth 8.

The concavity of the cup-shaped valve guide 7 includes an internal seat 11 for the spring 10 of the inner valve 9 and a second seat 12 which houses the inner valve 9 when in the fully open position.

The lateral skirt of the inner valve 9 contains a number of series of through-flow holes for the fluid, which will be described in detail later.

On the inside, close to the mouth 8 of the tubular base 3, is an annular seal 14 for sealing the mouth 8 when the inner valve 9 is in the closed position.

The closed position of the inner valve 9 is defined by an abutment 15 on the inside of the tubular outer body 2 against which a projecting abutment 16 on the outside of the inner valve 9 rests.

Between the tubular outer body 2 and the valve guide 7 is a sliding tubular body 20.

The sliding tubular body 20 is pushed by a spring 21 on the far side from the mouth 8 of the tubular outer body 2 for the selective closure of the fluid flow channels (FC).

The spring 21 is located in a lateral seat 22 formed in the valve guide 7.

Figure 2:
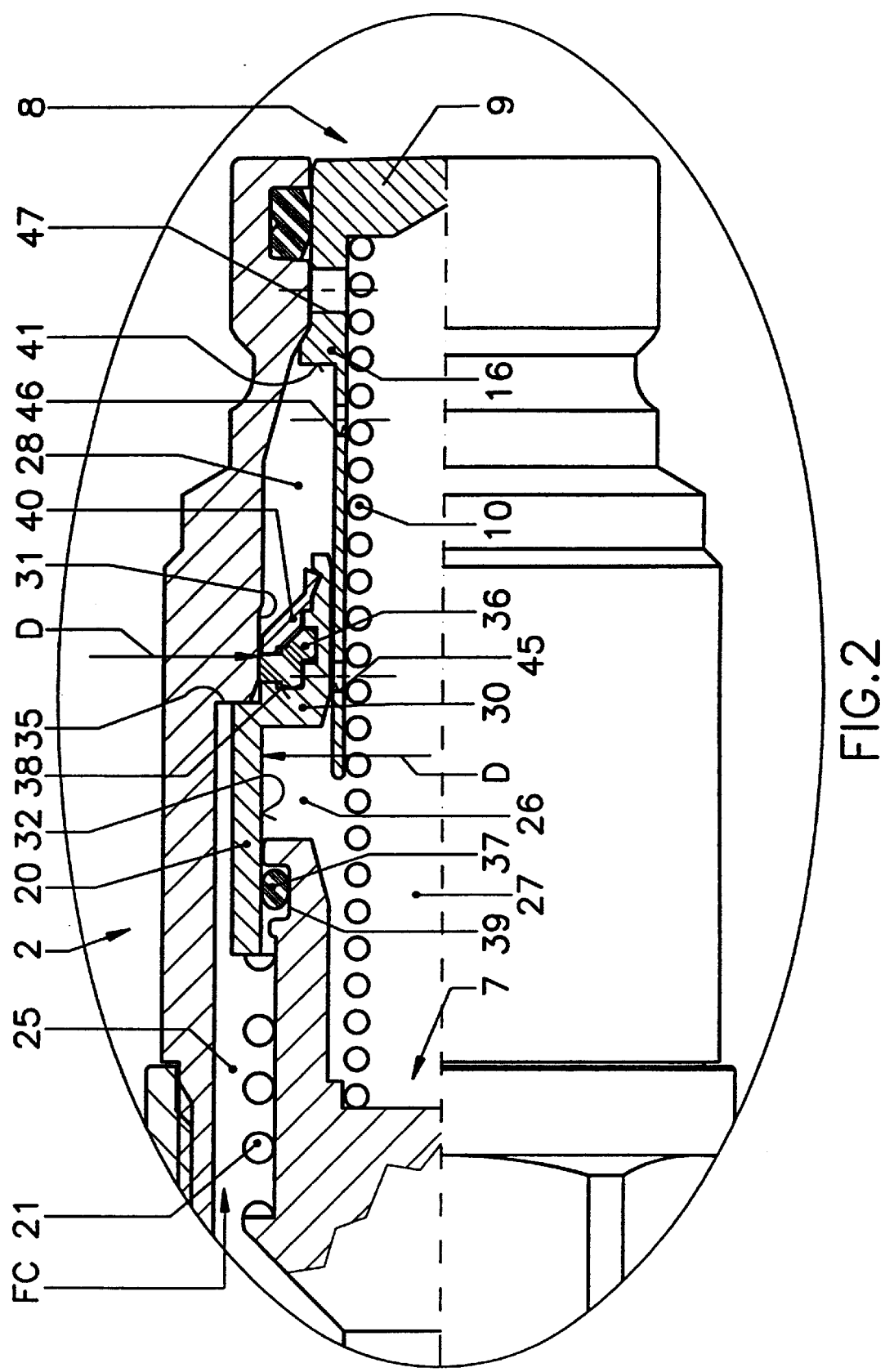
FIG. 2 shows a detail of the valve components of FIG. 1 in a partially sectioned side view.
Figure 3:
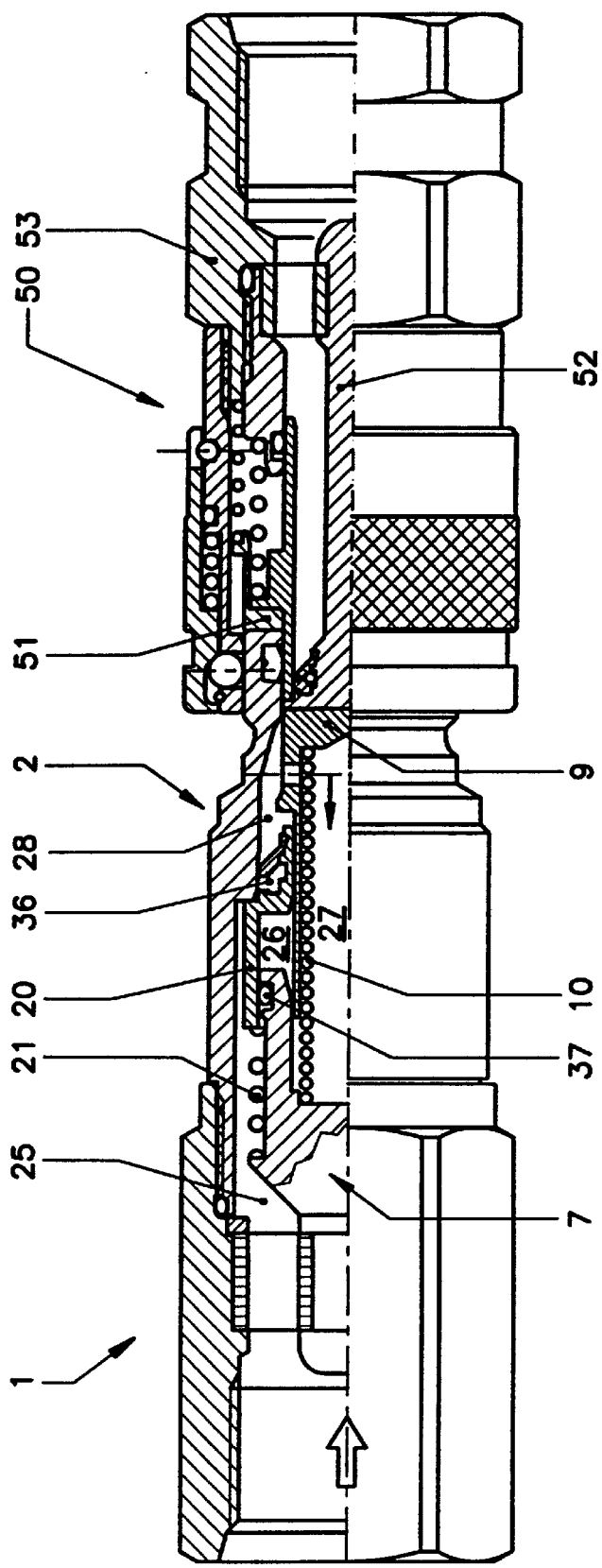
FIG. 3 shows the initial stage of connecting the male half of the coupling to the female half, in a partially sectioned side view.

It can be seen in FIG. 2 that when in the closed position, the sliding tubular body 20 obstructs the fluid flow channels (FC) by means of an abutment seat.

The sliding tubular body 20 divides the interior of the tubular outer body 2 into a rear chamber 25 behind the sliding tubular body 20 and front chambers 26, 27, 28 forward of the sliding tubular body 20.

The position of closure of the sliding tubular body 20 is determined by an opposing abutment seat 35 on the inside of the tubular outer body 2.

In the closed position, the sliding tubular body 20 is in sealing contact with the tubular outer body 2 and with the valve guide 7 and thus prevents the fluid present inside the rear chamber 25 from flowing into the front chambers 26, 27, 28.

The sealing action effected by the sliding tubular body 20 is such as to create balanced fluid pressures on the body of the sliding tubular body 20, as will be described in detail below.

The sliding tubular body 20 comprises a tubular extension 30 on the end nearest the mouth 8 of the coupling.

The tubular extension 30 is able to move into and out of a cylindrical seat 31 on the inside of the tubular outer body 2.

Inside the end facing away from the mouth 8 of the tubular outer body 2, the sliding tubular body 20 comprises a seat 32 in which the valve guide 7 is housed leaktightly.

The cylindrical seat 31 of the tubular outer body 2 and the seat 32 of the sliding tubular body 20 are of the same diameter (D).

As a result, the possibly pressurized fluid present inside the rear chamber 25 externally surrounds the sliding tubular body 20, acting on the opposing seals and pushing in a balanced way on the sliding tubular body. This is because the fluid is acting on identical cross sections of seals and pushing the sliding tubular body 20 with identical actions but of opposite direction. The pressurized fluid therefore leaves the sliding tubular body 20 in balance, held in the closed position by the spring 21.

Any additional action tending to push the sliding tubular body 20 open will not be opposed by the pressurized fluid present inside the rear chamber 25 and will only have to overcome the action of the spring 21 and friction.

The sliding tubular body 20 advantageously creates the desired leaktightness by means of seals 36 and 37 housed in respective annular seats 38, 39 formed in the sliding tubular body 20 and valve guide 7, respectively.

The seal 36 present in the sliding tubular body 20 will in particular be subjected to an extrusion action by the pressurized fluid during the opening of the sliding tubular body 20. The seal 36 is therefore made fast to the sliding tubular body 20 by a gland 40.

The seal 36 advantageously projects from the profile of the sliding tubular body 20, and is therefore proud of the annular seat 38, to a height varying from 1/20 to 5/10 of the height of the cross section of the seal. In this way the seal will remain firmly fixed to the sliding tubular body 20 despite the action of the pressurized fluid.

The seal 36 of the sliding tubular body 20 is preferably of polyurethane.

In contrast, the seal 37 located between the valve guide 7 and the sliding tubular body 20 is not subject to any appreciable extrusion action from the pressurized fluid. It is therefore possible to use, for example, an O-ring seal to prevent any leaks between the sliding tubular body 20 and the valve guide 7.

The sliding tubular body 20 is pushed by the inner valve 9 so as to tend to open the fluid flow channels (FC) via an annular operating relief 41 designed to abut against the sliding tubular body 20.

Because of its tubular extension 30, the sliding tubular body 20 advantageously slides the inner valve 9 in the center of the outer body 2 as it comes open. During the opening of the inner valve 9 its lateral skirt will close off the front chambers 26, 27, 28 from each other and prevent free circulation of the fluid contained within them. To obviate this drawback, a number of series of throughflow communication holes 45, 46, 47 are provided in the lateral skirt of the inner valve 9 to allow communication between the front chambers 26, 27, 28 and permit a free flow of fluid between the chambers 26, 27, 28. This gets round the problem of the fluid confined in one of these chambers making it difficult to open the valve 9, 20 as its pressure is raised.

Figure 4:
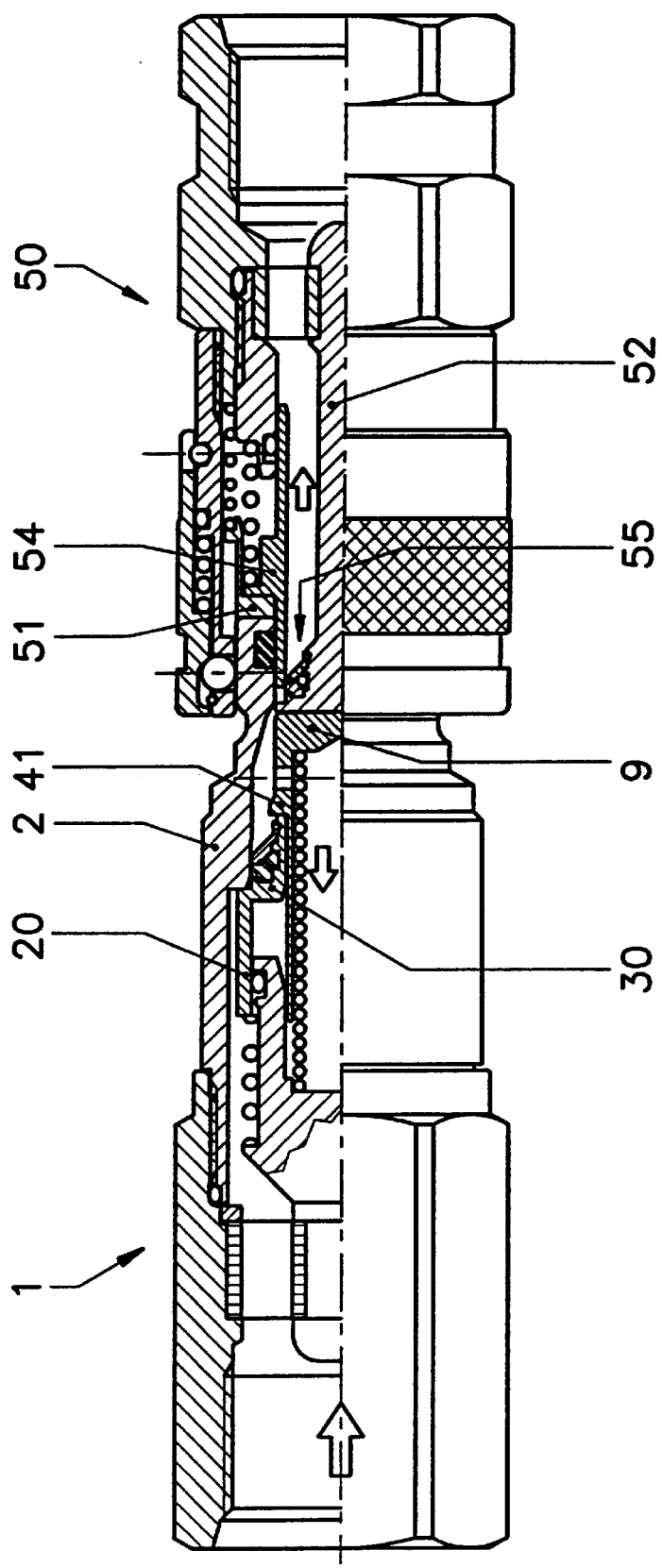
FIG. 4 illustrates the second stage of connecting the coupling with the inner valve of the female half partially open.
Figure 5:
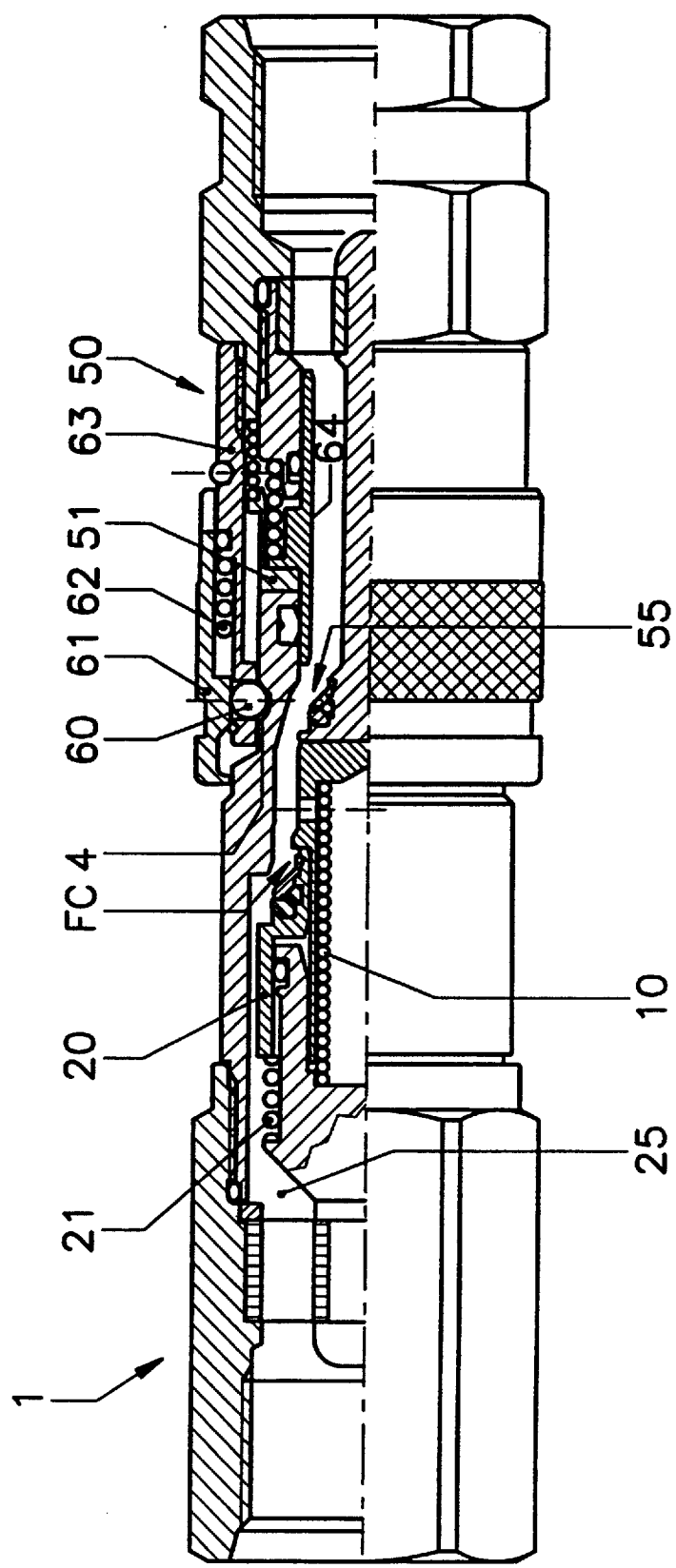
FIG. 5 shows the third stage in which the coupling is connected and the valves are fully open.

With the aid of FIGS. 4, 5 and 6 a description will now be given of the way in which the quick-action male coupling connectable under pressure works.

When the quick-action coupling is disconnected, areas in the interior of the male half 1 may contain fluid under pressure.

If, for accidental external reasons, the pressure rises in the section of hydraulic circuit present in the user machine to which the male half 1 is connected, the pressurized fluid is retained in the rear chamber 25 of the male half 1 of the coupling by the seals 36, 37 of the sliding tubular body 20 while the front chambers 26, 27, 28 will be at zero relative pressure.

When starting to connect the male half 1 to the female half (the female half has the general reference 50, FIG. 4), the male half 1 is inserted into the female half 50, pushing back the outer slider 51. This is because the valve 52 of the female half 50 is integral with the valve body 53, and so the valve 52 pushes the inner valve 9 of the male half 1 backwards.

The inner valve 9 moves without difficulty because the front chambers 26, 27, 28 contain fluid at zero relative pressure and the fluid compressed by the movement of the inner valve 9 present in the chamber 27 can flow through the holes 45, 46, 47 in the skirt of the inner valve 9 into the other chambers 26, 28.

As the coupling of the male half 1 to the female half 50 proceeds (FIG. 5), the inner valve 9 of the male half 1 presses mechanically via its annular operating relief 41 on the tubular extension 30 of the sliding tubular body 20 and begins to push the sliding tubular body 20 back.

The sliding tubular body 20 is hydraulically in equilibrium as the seals 36, 37 are in sealing contact with surfaces (the seats marked 31, 32) of equal diameter (D).

The force required to effect the connection is therefore equal to no more than the sum of the loads of the compressed springs (spring 10 of the inner valve 9 and spring 21 of the sliding tubular body 20) and of the friction of the seals 36, 37 subjected to the pressure of the fluid.

As coupling proceeds, the inner valve 9 and the sliding tubular body 20, now integral with each other, are pushed axially by the valve 52 of the female half 50.

Similarly the male half 1, by means of its tubular outer body 2, pushes back the outer slider 51 of the female half 50 which in turn pushes back the inner slider 54 and opens the flow channels 55 defined by the inner slider 54 and valve 52.

As coupling continues (FIG. 6), the displacement of the outer slider 51 opens the flow channels 55 in the female half 50 and the displacement of the sliding tubular body 20 opens the flow channels FC in the male half 1. The pressurized fluid present in the rear chamber 25 can thus flow out of the male half 1 into the female half 50 of the quick-action coupling.

On completion of the connection, the locking mechanism of the female half 50, which consists of a ring of balls 60 and a ring nut 61 pushed by a spring 62, engages with the coupling profile 4 on the exterior of the male half 1 so as to lock the coupling.

The quick-action coupling, once connected up and under operating conditions, carries pressurized fluid. If the quick-action coupling is accidentally or intentionally disconnected without reducing the pressure of the fluid (by pulling back the ring nut 61 to free the ball ring 60), the springs 10, 21, 63, 64 and the pressure of the fluid will expel the male half 1.

As the male half 1 is being expelled (FIG. 5), the sliding tubular body 20 recloses, under the action of the spring 21, and obstructs the flow channels FC of the fluid coming from the rear chamber 25.

As uncoupling continues, the inner slider 52 of the female half 50 is pushed by the spring 64 and closes the flow channels 55 in the female half 50.

As the disconnection operation continues (FIG. 4) the inner valve 9, pushed by the spring 10, follows the valve 52 of the female half 50 and returns to the At position of closure of the mouth 8 of the male half 1.

The movements of the sliding tubular body 20 and of the inner valve 9 increase the volume of the front chambers 26, 27, 28, which lowers the pressure of the fluid within them and so creates the ideal conditions for a subsequent connection operation, where the pressurized fluid is isolated in the rear chamber 25 and is held back by the seals 36, 37 which are balanced hydraulically while the front chambers 26, 27, 28 contain fluid at circa zero relative pressure and are in communication with each other.

I claim:

1. A quick-action male coupling (1) connectable under pressure, consisting of an outer body (2), a valve guide (7) and an inner valve (9), wherein between the outer body (2) and the valve guide (7) is a sliding tubular body (20); at one end the sliding tubular body (20) is pushed by a spring (21); the opposite end of the sliding tubular body (20) from that pushed by the spring (21) has an abutment seat; the outer body (2) internally presents an opposing abutment seat (35) to the sliding tubular body (20); between the sliding tubular body (20) and the outer body is a sealing means (36); between the sliding tubular body (20) and the valve guide (7) is a second sealing means (37); the contact surfaces of the sealing means (36) and of the second sealing means (37) are aligned; and, as the inner valve (9) opens, the sliding tubular body (20) is displaceable by an annular operating relief (41) on the inner valve (9).

2. The quick-action male coupling (1) as claimed in claim 1, wherein the sliding tubular body (20) comprises, at the end nearest the mouth (8) of the outer body (2), a tubular extension (30) that can be inserted leaktightly into a cylindrical seat (31) present on the inside of the outer body (2); and at the end furthest from the mouth (8) of the outer body (2) the sliding tubular body (20) comprises an internal seat (32) that leaktightly houses the valve guide (7); and the seat (32) of the sliding tubular body (20) and the cylindrical seat (31) of the outer body (2) are of the same diameter (D).

3. The quick-action male coupling (1) as claimed in claim 1, wherein the valve guide (7) is cup-shaped with its concavity toward the mouth (8) of the outer body (2).

4. The quick-action male coupling (1) as claimed in claim 1, wherein the inner valve (9) comprises, in its lateral skirt, a plurality of through-flow communication holes (45, 46, 47) for the fluid.

5. The quick-action male coupling (1) as claimed in claim 1, wherein the outer body (2) is composed of a tubular base (3) comprising a shaped outer engagement surface (4), and the tubular base (3) is connected to a tubular adaptor (5).

6. The quick-action male coupling (1) as claimed in claim 1, wherein the sliding tubular body (20) possesses an external annular seat (38) housing a seal (36), and the seal (36) is made fast to the sliding tubular body (20) by a gland (40).

7. The quick-action male coupling (1) as claimed in claim 6, wherein the seal (36) projects out of the annular seat (38) by $1/20$ to $5/10$ of the height of its transverse section.

8. The quick-action male coupling (1) as claimed in claim 6, wherein the seal (36) of the sliding tubular body (20) is of polyurethane.

9. The quick-action male coupling (1) as claimed in claim 1, wherein the valve guide body (7) possesses an external annular seat (39) housing a seal (37).

10. The quick-action male coupling (1) as claimed in claim 1, wherein the valve guide (7) possesses an external annular seat (22) for the spring (21) of the sliding tubular body (20).

11. The quick-action male coupling (1) as claimed in claim 1, wherein a tubular extension (30) of the sliding tubular body (20) supports and guides the inner valve (9).

* * * * *